United States Patent [19]

Wrezel et al.

[11] Patent Number: 5,128,162

[45] Date of Patent: Jul. 7, 1992

[54] METHOD FOR REMOVING CHOLESTEROL FROM EDIBLE OILS

[75] Inventors: Paul W. Wrezel, Chicago; R. G. Krishnamurthy, Glenview; Gerard L. Hasenhuettl, Highland Park, all of Ill.

[73] Assignee: Kraft General Foods, Inc., Northfield, Ill.

[21] Appl. No.: 560,366

[22] Filed: Jul. 31, 1990

[51] Int. Cl.⁵ .............................................. C11B 3/00
[52] U.S. Cl. .................................. 426/417; 426/425; 426/429; 426/490; 426/491; 554/174; 554/191; 554/193; 554/206
[58] Field of Search ............... 426/614, 417, 429, 478, 426/490, 491, 425; 260/424, 427, 428

[56] References Cited

U.S. PATENT DOCUMENTS

| | | | |
|---|---|---|---|
| 3,682,993 | 8/1972 | Wetzold | 260/428 |
| 3,955,004 | 5/1976 | Strauss et al. | 260/428 |
| 4,189,442 | 2/1980 | Lubsen et al. | 260/427 |
| 4,290,774 | 9/1981 | Girgis et al. | 436/13 |
| 4,393,145 | 7/1983 | Zemp | 521/38 |
| 4,849,112 | 7/1989 | Barder et al. | 210/674 |
| 4,880,573 | 11/1989 | Courregelongue et al. | 426/417 |

FOREIGN PATENT DOCUMENTS 57-77699  5/1982  Japan.

OTHER PUBLICATIONS

Strveitwieser, A. Introduction to Organic Chemistry, 1976, MacMillan Publishing Co., pp. 480 and 481.

Primary Examiner—Donald E. Czaja
Assistant Examiner—Anthony Weier
Attorney, Agent, or Firm—Fitch, Even, Tabin & Flannery

[57] ABSTRACT

Generally in accordance with the present invention, methods are provided for removing cholesterol from edible triglyceride oils. In this regard, animal fats typically contain cholesterol predominantly in the form of free cholesterol, as well as minor amounts of cholesterol esters of fatty acids such as cholesteryl oleate or palmitate. The present methods may be used to remove cholesterol from both animal and vegetable triglyceride oils, including, but not limited to, butterfat, beef tallow, fish oil, lard, soybean oil, canola oil, corn oil, sunflower oil, cottonseed oil, safflower oil, olive oil and peanut oil.

23 Claims, 2 Drawing Sheets

METHOD FOR REMOVING CHOLESTEROL FROM EDIBLE OILS

BACKGROUND OF THE INVENTION

The present invention relates to methods for removing cholesterol from edible triglyceride fats and oils including animal fats, marine oils and vegetable oils, to prepare reduced cholesterol fats and oils.

Substantial research effort has been directed to removal of cholesterol from animal fats and egg products, as well as to the preparation of cholesterol-reduced food products which include animal fats such as milkfat and beef tallow, or egg products such as egg yolk as important functional constituents of the food product. A variety of techniques to remove cholesterol from animal fats, egg yolks and whole eggs have been proposed or utilized, but have various disadvantages. One approach would utilize microorganisms to enzymatically oxidize and degrade cholesterol [Japanese Patent 60-18375], but produces cholesterol oxidation products which may be undesirable. Organic solvents have also been used to extract cholesterol [JP 48/44458, U.S. Pat. Nos. 4,104,286, 3,881,034, 3,563,765, 4,234,619 and Tokarska, et al., Can. Inst. Food Sci. Tech. J., 18:256-258 (1985)], but such extraction methods tend to remove a substantial portion of the triglyceride oils, and may require extensive processing steps to remove after extraction solvents from the extracted product. Even with supercritical carbon dioxide as the solvent, selectivity of cholesterol over triglycerides may be limited [Prepared Foods, 157:186 (1988); JP 59/135847]. Edible vegetable oils such as soybean oil have also been used to extract cholesterol from egg yolks as described in U.S. Pat. Nos. 3,717,414, 4,103,040 and 4,333,959. However, such extractions produce a waste stream of spent cholesterol-containing vegetable oil. An economical process for regenerating this spent oil would accordingly be desirable.

U.S. Pat. No. 4,804,555 discloses a process for the simultaneous deodorization and cholesterol level reduction of fish oils. The fish oil is deaerated, mixed with steam, heated, flash vaporized, thin film-stripped with a countercurrent stream, and cooled. U.S. Pat. No. 4,234,619 discloses a method for cholesterol removal from eggs by dehydrating the eggs, extracting the cholesterol with liquid dimethyl ether under anhydrous conditions, and removing the dimethyl ether by treatment under reduced pressure at low temperatures. U.S. Pat. No. 4,104,286 describes the isolation of cholesterol from eggs through extraction with ethanol, saponification in an aqueous ethanolic alkali metal hydroxide, and concentration and purification with a hydrocarbon solvent and methanol. U.S. Pat. No. 4,393,044 describes the formation of a steroid ester to be used as an oil phase material or base material for cosmetics or ointments. However, such techniques each have various disadvantages, and improved methods for removing cholesterol from triglyceride oils would be desirable. Accordingly, it is an object of the present invention to provide new methods for removing cholesterol from fats and oils.

DESCRIPTION OF THE INVENTION

Figure 1:
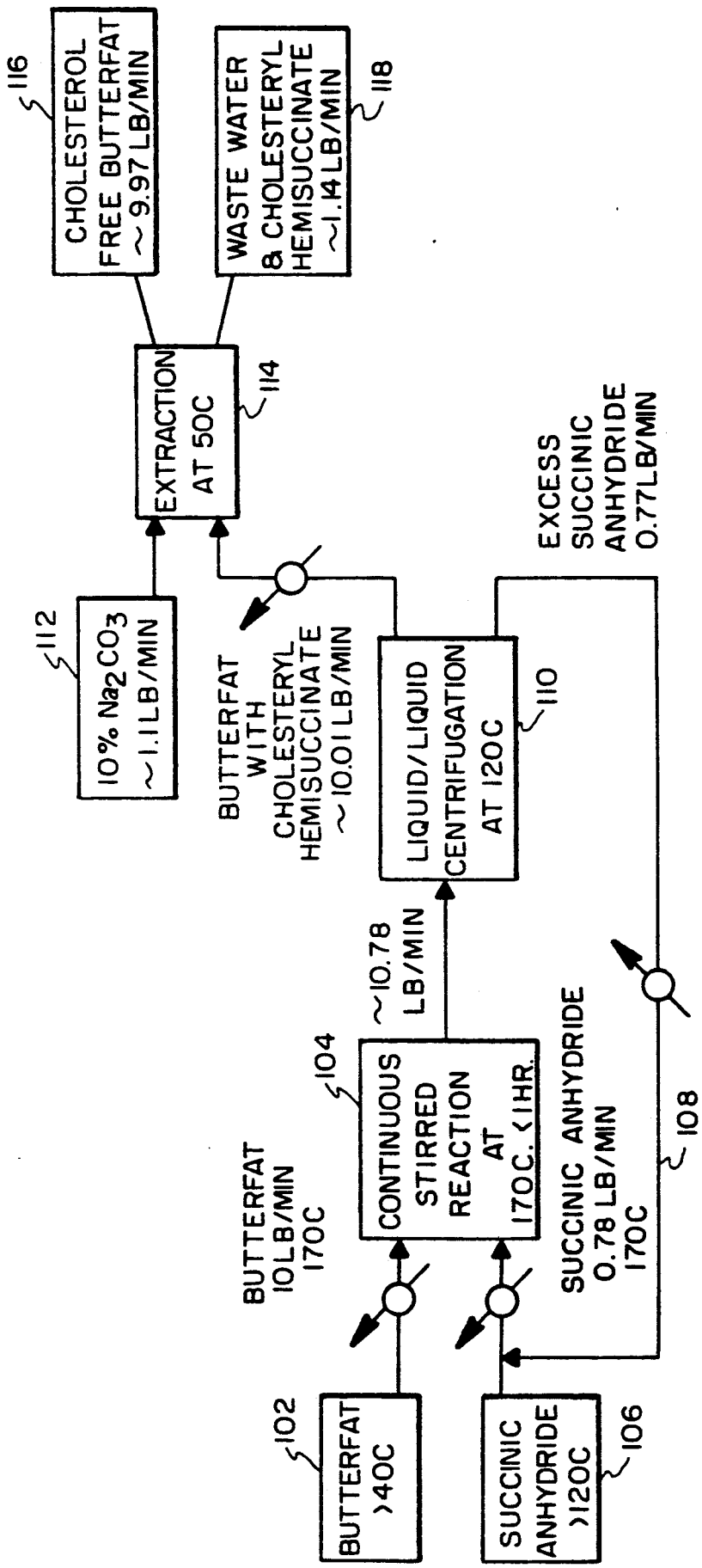
FIG. 1 is a process diagram for an embodiment of a method for removing cholesterol from triglyceride oils and fats.

Generally in accordance with the present invention, methods are provided for removing cholesterol from edible triglyceride oils. In this regard, animal fats typically contain cholesterol predominantly in the form of free cholesterol, as well as minor amounts of cholesterol esters of fatty acids such as cholesteryl oleate or palmitate. Butterfat typically contains from about 0.25 to about 0.3 weight percent of cholesterol, based on the total weight of the butterfat. Tallow typically contains from about 0.1 to about 0.2 weight percent cholesterol. Other cholesterol-containing foods such as egg yolks may contain relatively high levels of cholesterol. In this regard, egg yolks may contain from about 0.5 to about 2.5 weight percent of cholesterol, on a dry basis. Vegetable oils, which contain plant sterols, but which do not ordinarily contain significant amounts of cholesterol, may be used as cholesterol extraction agents for cholesterol-containing food products such as egg yolks, thereby producing a vegetable oil waste stream which contains cholesterol. Accordingly, the present methods may be used to remove cholesterol from both animal and vegetable triglyceride oils, including, but not limited to, butterfat, beef tallow, fish oil, lard, soybean oil, canola oil, corn oil, sunflower oil, cottonseed oil, safflower oil, olive oil and peanut oil.

In accordance with the present methods, cholesterol-containing triglyceride oils may be reacted with a polybasic acylating agent to form an acidic cholesterol monoester of the corresponding polybasic acid. The polybasic acylating agents which are particularly useful in accordance with the present methods include cyclic acid anhydrides such as malonic anhydride, glutaric anhydride, succinic anhydride, phthalic anhydride and maleic anhydride, as well as polymeric cyclic anhydrides such as maleic anhydride copolymers with other monomers such as styrene, vinyl ethers, acrylic and methacrylic esters; and polybasic acid halides such as succinyl dichloride and phosphorous oxychloride. The term polybasic acylating agent is also defined herein to include reagents wherein a halide, such as chloride, is the anhydride portion of the acid, for example, succinyl chloride.

In carrying out such reaction, the cholesterol-containing triglyceride oil is desirably provided in substantially anhydrous form. By "substantially anhydrous" is meant that the moisture content is less than 1 weight percent, based on the weight of the oil. Preferably, the moisture content of the oil will be less than 0.2 weight percent. It is desirable, however, that the oil contain a very small amount of moisture, such as in the range of from about 0.001 to about 0.1 weight percent moisture to facilitate the reaction. However, because of its reactivity with the polybasic acid agent excess moisture should be compensated by additional agent, which may be economically undesirable.

To carry out the reaction, the oil is combined with at least 2-fold molar excess of the polybasic acylating agent with respect to the free cholesterol content of the oil. Additional polybasic acid acylating agent is added to compensate for other oil components, including water, mono- and diglycerides, trace alcohols, and plant sterols, and any other hydroxyl-containing compounds in addition to cholesterol which are also capable of reacting with the acylating agent. The reaction is carried out at a temperature above the melting temperature of the oil, for a time sufficient to esterify at least about 50 percent, and preferably at least 90 percent of the free cholesterol of the oil.

The presence of a small amount of water produces free acid components derived from the polybasic acylating agent which serve to catalyze the esterification reaction. However, esterification catalysts may also be added directly. In this regard, mono and polybasic acids such as citric acid, acetic acid, succinic acid, lactic acid and phosphoric acid, as well as other edible and food safe esterification catalysts may be added to the reaction mixture, typically at levels in the range of from about 0.001 to about 1.0 weight percent, based on the weight of the oil.

While particular reaction agents such as phosphorous oxychloride may be reacted at relatively low temperatures, it is desirable that with certain polybasic acylating agents such as succinic anhydride the reaction be carried out at a temperature of at least about 100° C. The reaction time to achieve a desired level of cholesterol esterification will vary, depending on the inherent reactivity of the polybasic acylating agent, concentration of agent, temperature, composition of oil, degree of mixing and catalytic effects, but typically will be at least about 5 minutes.

Following the cholesterol esterification reaction, the excess polybasic acylating agent is preferably removed from the reaction mixture at a temperature above the melting point of the oil. In this regard, for example, excess succinic anhydride, which has a melting point of about 119.6° C., and which has limited solubility in the triglyceride oil, may be separated in the solid state by centrifugation or filtration from the liquid oil at a temperature below the melting point of the succinic anhydride. The unreacted polybasic acylating agent and any acid catalysts or incidental hydrolysis products may also be at least partially removed by a solvent extraction step such as a water wash step.

As indicated, the polybasic acylating agent is reacted with the free cholesterol to form an acidic cholesteryl monoester of the corresponding acid of the polybasic acylating agent, in which the monoester is more hydrophilic than free cholesterol. The acid cholesteryl monoester reaction product has, or may be readily hydrolyzed (e.g., an acid chloride) to form at least one free acid group which provides the compound with a higher degree of hydrophilic or polar characteristics than the original free cholesterol.

This acidic reaction product is subsequently separated from the triglyceride oil. In this regard, a separation phase material is provided which is capable of partitioning cholesteryl polybasic acylating agent reaction products from the triglyceride oil to the separation phase material. The separation phase material may be a liquid or solid which is not miscible with the triglyceride oil. Liquid separation phase materials should be more hydrophilic than the triglyceride oil, and should desirably be capable of ionizing at least one free acid group of the polybasic acylating agent reaction product. Water and lower alkyl monohydric alcohols, such as methanol and ethanol, lower alkyl polyols such as glycerol, and mixtures thereof may be used as liquid separation phase agents. Aqueous phase extraction agents having a pH greater than 7 are particularly preferred liquid separation phase materials. Preferably, the pH of such aqueous liquid separation phase extraction agents will be in the range of from about 8 to about 13. Such aqueous phase extraction agents may be provided by dissolving or suspending basic alkali and/or alkaline earth hydroxides or salts of weak acids such as carbonates, bicarbonates and phosphates, in water.

To carry out the partition separation using a liquid separation phase material, the triglyceride oil containing the cholesteryl polybasic acylating agent reaction product is mixed with the liquid phase separation material under batch, co-current or countercurrent extraction conditions. It is preferred that the triglyceride oil be above its melting temperature, and typically the extraction temperature will be in a temperature range of the temperature at which substantially all of the oil is melted, to about 100° C. For example, butterfat has a melting temperature of about 35° C., and the extraction may conveniently be carried out at about 45° C., while the extraction of soybean oil may be conveniently carried out at ambient temperature (e.g., 20°-25° C.) because of the liquid state of the oil at lower temperatures.

In carrying out the extraction, the weight ratio of the triglyceride oil to the liquid separation phase material will be preferably be in the range of from about 0.1 to about 100. Continuous or staged countercurrent extraction techniques are more efficient, and may utilize less aqueous phase extraction agent volume for a given amount of triglyceride oil volume. Batch extraction techniques are less efficient, and it may be desirable or necessary to utilize multiple extraction steps to achieve a desired level of cholesterol removal using batch extraction processes.

The triglyceride oil and the basic aqueous phase extraction agent are combined under mixing conditions which increase the interfacial contact between the oil and aqueous phases. Under such conditions, the one or more free acid groups of the cholesteryl polybasic acylating agent reaction product are ionized to form a salt which has greatly reduced solubility in the triglyceride phase, and which is partitioned to the aqueous phase or aqueous phase-oil phase interface. In this manner, a cholesterol-depleted oil phase and cholesterol-enriched liquid extraction phase are provided.

After thoroughly mixing the triglyceride oil phase and the liquid separation phase, the mixture may be centrifuged to facilitate the separation of the cholesterol-depleted triglyceride oil phase from the cholesterol-enriched liquid extraction phase. Desirably, the mixture may be subjected to a centrifugal force of at least about $100 \times g$, and preferably in the range of from about 750 to about $10,000 \times g$ to separate the multiphase components. Upon centrifugation, the components will typically separate into phase layers depending upon density. For example, when using an aqueous extraction agent, the extraction mixture will separate into a low density, cholesterol-depleted oil phase, a relatively high density aqueous phase, and an intermediate phase containing the predominant portion of the basic salt of the cholesteryl polybasic acylating agent reaction product extracted from the oil phase.

In addition to liquid separation phase materials, solid separation phase materials may also be utilized to separate or partition the acidic cholesteryl polybasic acylating agent reaction product from the triglyceride oil. Such solid separation phase materials may be organic or inorganic materials which preferentially adsorb the cholesteryl polybasic acylating agent reaction product from the oil phase.

Such inorganic solid phase separation materials include bleaching clays such as high surface area acid-activated montmorillonite clays, and diatomaceous earth. In using such adsorbents, the adsorbents may be contacted with the triglyceride oil containing the cholesteryl polybasic acylating agent reaction product at a weight ratio of from about 5000 to about 0.5 of the oil to the clay, and preferably at such a weight ratio of at least about 20. Such contacting may be carried out in batch, or continuous bed processes such as fluidized bed and fixed bed or simulated countercurrent bed contacting techniques. It is preferred that such contacting steps be carried out under substantially anhydrous conditions. Moreover, the effectiveness of partitioning or separation removal of the cholesterol ester from the oil phase is substantially improved by carrying out at least a portion of the contacting step under conditions of elevated temperature and subatmospheric pressure. In this regard, a contacting temperature of at least about 35° C. and preferably at least about 90° C., under a vacuum of less than 50 millimeters of mercury. Preferably a reduced pressure of less than 30 millimeters of mercury will be used. It is believed that such heat and vacuum treatment removes residual water from either or both the oil or the clay, to facilitate interaction of the cholesteryl polybasic acylating agent reaction product with the clay. The interaction of the cholesteryl polybasic acylating agent reaction product with the clay depletes the triglyceride oil of the cholesteryl polybasic acylating agent reaction product. The clay may be separated from the cholesterol-depleted triglyceride oil in any suitable manner such as by filtration or centrifugation for batch contacting methods. Fixed and fluidized bed continuous contacting processes are completed by passage of the oil through the contacting zone or column, but may be supplemented by a filtration or centrifugation step.

As indicated, the solid phase separation agent may also be an organic material which is capable of preferentially adsorbing the cholesteryl polybasic acylating agent reaction product from the triglyceride oil by ionic electrostatic interaction and salt formation. Such material includes cationic polymers such as synthetic anionic exchange resins, naturally occurring cationic polymers or derivatives thereof such as chitosan. The organic separation phase materials may be used in a batch or continuous manner like those previously described with respect to inorganic separation phase materials. They may be regenerated for reuse by an aqueous water wash at high pH (e.g., pH 12-14, as provided by sodium carbonate or sodium hydroxide solutions).

Cholesterol esterase hydrolysis treatment may be carried out prior to any treatment with the polybasic acylating agent, or may be carried out after a substantial portion of the cholesterol has been removed, followed by subsequent re-treatment of the esterase hydrolyzed triglyceride.

Having generally described certain aspects of the present invention, various additional aspects of the invention will be further described with respect to the specific embodiment shown in FIG. 1, which is a flow diagram schematically illustrating a continuous process for removing cholesterol from butterfat.

As shown in FIG. 1, butterfat 102 at a fluid temperature greater than 40° C. is continuously introduced at a predetermined rate (e.g., 10 lb/min) into a continuous reactor system 104, which is maintained at a reaction temperature of 170° C. Molten succinic anhydride 106 is metered from storage tank 106 into reactor 104 together with a recycle succinic anhydride stream 108, which will be described in more detail hereinafter. The combined succinic anhydride streams 106, 108 are metered into the continuous reactor system 104 at a temperature of 170° C. at a predetermined rate (e.g., 0.78 pounds per minute) which provides a substantial molar excess with respect to the cholesterol, moisture and mono and diglycerides content of the butterfat 102. The reactor 104 maintains the butterfat and the succinic anhydride at reaction temperature under conditions of mixing, and may be a multitubular reactor, a continuous staged horizontal reactor, a vertical reactor, or one or more serially connected continuously stirred tank reactors, or other suitable reactors. The reaction conditions are maintained in the reactor for a time period of less than about one hour, which is sufficient to react substantially all of the free cholesterol of the butterfat 102 with the succinic anhydride 106 to form cholesteryl hemisuccinate. The resulting reaction mixture, containing butterfat, cholesteryl hemisuccinate and excess succinic anhydride, is conducted to liquid/liquid centrifuge 110 (e.g., at a rate of 10.78 pounds per minute) where the more dense, excess succinic anhydride phase 108 (e.g.,at a rate of about 0.77 pounds per minute) is separated and returned to the reactor 104, as succinic anhydride stream 108.

The remaining, lighter components 112 from the centrifuge 110 comprising butterfat and cholesteryl hemisuccinate, are conducted (e.g., at a rate of 10.01 pounds per minute) to an extractor system 114 where they are mixed with an aqueous extraction agent 112 (e.g., at a rate of about 1.1 pounds per minute) consisting of a 10 weight percent aqueous sodium carbonate solution, based on the total weight of the solution. As indicated, the sodium carbonate solution 112 and the succinylated butterfat are mixed in extractor system 114, where the phases are mixed and subsequently separated (e.g., by centrifugation) to form a substantially cholesterol-free butterfat product 116, and an aqueous waste stream 118 comprising water, cholesteryl hemisuccinate and excess sodium carbonate. If any colloid or soap containing cholesteryl hemisuccinate is present in the oil following centrifugation, the oil may be further processed to increase the removal efficiency. For example, the oil can be treated with an absorbent clay or diatomaceous earth, and subsequently filtered or centrifuged to produce a purified oil product.

Additional, specific aspects of the invention are described in the following Examples.

EXAMPLE 1

Spent soybean oil from use in extraction of cholesterol from egg yolks, having a total cholesterol concentration of approximately 0.3–0.4% (w/v) was subjected to cholesterol removal treatment by succinylation to form cholesteryl hemisuccinate in the soybean oil, and subsequent separation of the cholesteryl hemisuccinate from the soybean oil.

Succinic anhydride was reacted under nitrogen with the cholesterol-containing soybean oil in a 100 ml-capacity Pyrex round-bottom, three-neck flask. Continuous mixing was achieved with the use of a magnetic stirring bar. A number of runs were carried out in which 50 ml amounts of the cholesterol-containing soybean oil was heated to 120° C. to 170° C. When the desired temperature was reached, 5 grams of succinic anhydride was added (1 M final concentration) and the reaction was allowed to proceed for up to 2 hours. In some runs, phosphoric acid was also added as catalyst to a level of 0.1% upon reaching reaction temperature. At the end of the incubation, the cholesterol-containing soybean oil was cooled to room temperature and centrifuged at 1000 g for 10 minutes at 25° C. to sediment the unreacted succinic anhydride. The extent of derivatization was measured and expressed as the decrease in free cholesterol level relative to that present in the untreated cholesterol-containing soybean oil. The succinic anhydride-treated cholesterol-containing soybean oil from each of these runs was subjected to either aqueous extraction or other separation treatments to remove the succinylated compounds as described hereinafter.

Separation of cholesteryl hemisuccinate was carried out by triple extraction with 0.1 relative volume of 10% $Na_2CO_3$ (pH 11.5) at 25° C. The effects of varying extraction number (one to six), relative volume (0.1 to 0.5), and temperature (25° C. vs 45° C.) were assessed in separate runs. In addition, the use of 0.01 N NaOH (pH 12) or 10% $Na_2CO_3$ supplemented with 5 M NaCl was compared with the use of 10% $Na_2CO_3$.

The succinic anhydride-treated cholesterol-containing soybean oil was washed with one volume of deionized water prior to extraction with the various alkaline solutions. Low-speed centrifugation (1000×g for 10 minutes at 25° C.) was employed to facilitate separation of the aqueous and oil phases. The washed cholesterol-containing soybean oil and extractant were then combined in either 15 ml- or 50 ml-size capped conical plastic tubes. The contents of the tubes were gently mixed by inversion back-and-forth ten times. The samples were then immediately centrifuged (1000×g for 10 minutes at 25° C.) to separate the aqueous, soapy-interfacial, and cholesterol-depleted soybean oil phases. The soybean oil phase from each sample was collected and the extractions were repeated various numbers of times. Following the last extraction, the soybean oil was water-washed with 1 volume of deionized water as previously described. The soybean oil was analyzed qualitatively for removal of derivatives by thin-layer chromatography. Free and total cholesterol were quantitated by gas chromatography to calculate the percentage removal of cholesteryl hemisuccinate, according to the following equation:

$$\% \text{ extracted} = \frac{[\text{total chol}]_{ctrl} - [\text{total chol}]_{ex}}{[\text{total chol}]_{ctrl} - [\text{free chol}]_{rxn}} \times 100$$

where ctrl represents untreated cholesterol-containing soybean oil, rxn represents succinic anhydride-treated cholesterol-containing soybean oil, and ex represents succinic anhydride-treated, extracted cholesterol-containing soybean oil. This equation corrects for endogenous cholesterol esters and underivatized free cholesterol. Note that the value for [total chol]$_{rxn}$ should be close to that for [total chol]$_{ctrl}$, however the former may be slightly lower ($\leq 5\%$ difference); it is believed that some of the derivatized cholesterol is trapped by the bulk succinic anhydride as it solidifies upon cooling.

Figure 2:
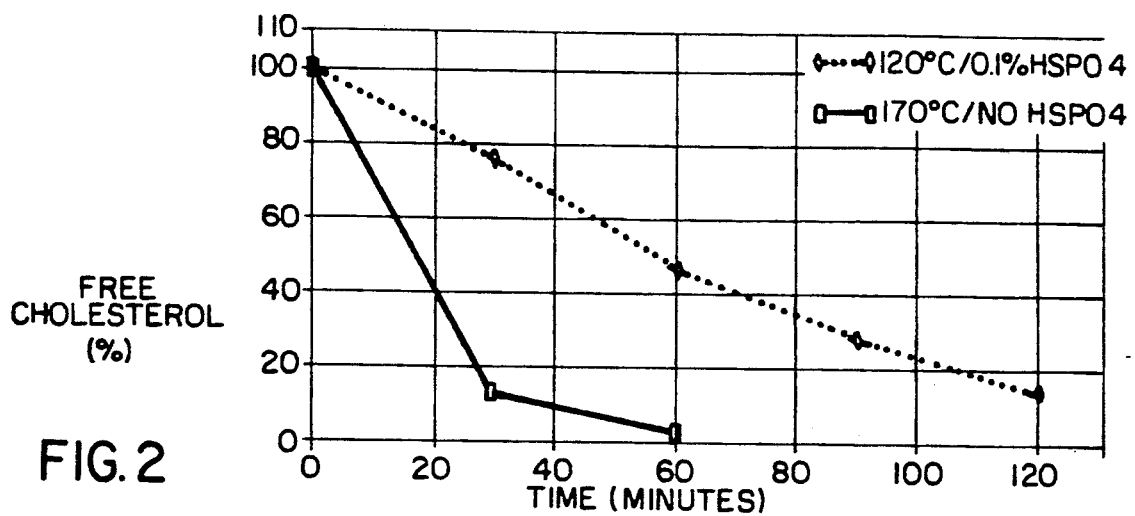
FIG. 2 is a graphical representation of a reaction time course comparing phosphoric acid-catalyzed succinylation of free cholesterol in soybean oil, at 120° C., with uncatalyzed succinylation at 170° C., as a function of reaction time.

Time courses of the succinic anhydride treatment (FIG. 2) show that the free cholesterol level was decreased by approximately 80% at 120° C. after 2 hours (catalyzed by $H_3PO_4$; curve 202) and by 99% at 170° C. after 1 hour (uncatalyzed; curve 204). If the $H_3PO_4$ catalyst was present at 170° C., the same cholesterol decrease could be achieved within 30 minutes.

The effectiveness of aqueous extraction for the removal of cholesteryl hemisuccinate and other derivatives was evaluated. Table 1 shows the effect of varying the extractant/oil ratio, showing an inverse relationship for removal of cholesteryl hemisuccinate with respect to this ratio.

TABLE 1

| | Cholesteryl Hemisuccinate Removal Versus Relative Extractant Volume | | | |
|---|---|---|---|---|
| Extractant Oil Ratio | Moisture (%) | Free Chol (mg/100 g) | Total Chol (mg/100 g) | % Cholesteryl Hemisuccinate Extracted |
| 0.1 | 0.72 | 6 | 71 | 87 |
| 0.2 | 1.13 | 5 | 99 | 76 |
| 0.5 | 0.95 | 6 | 104 | 75 |
| not extracted control | 0.07 | 8 | 305 | — |
| soybean oil | 0.38 | 273 | 304 | — |

As the extractant/oil ratio increased, so did the amount of moisture retained in the sample. Thus, the best condition for extraction was an extractant/oil ratio of 0.1. Glyceride analysis of succinic anhydride-treated cholesterol-containing soybean oil and the extracted samples indicate that the triglyceride profiles are not significantly changed by 10% $Na_2CO_3$ extraction, but that mono- and diglycerides are increased (Table 2):

TABLE 2

| | Glycerides Profiles of Succinic Anhydride-Treated and Extracted Oil | | | | |
|---|---|---|---|---|---|
| | | | Extracted with n Volume 10% $Na_2CO_3$ | | |
| Liquid | Control | Succinic Anhydride-Treated | n = 0.1 | n = 0.2 | n = 0.5 |
| Fatty acids | <0.1 | <0.1 | <0.1 | <0.1 | <0.1 |
| Monoglycerides | <0.1 | <0.1 | 2.0 | 1.7 | 2.8 |
| Diglycerides | 0.9 | 0.8 | 6.0 | 5.3 | 8.2 |
| Triglycerides | | | | | |
| C.#48 | 0.6 | 0.4 | 0.3 | 0.3 | 0.3 |
| C.#50 | 5.0 | 4.9 | 4.6 | 4.7 | 4.4 |
| C.#52 | 30.5 | 30.8 | 28.5 | 28.7 | 27.4 |
| C.#54 | 60.0 | 60.3 | 55.9 | 56.5 | 54.2 |
| C.#56 | 2.2 | 2.1 | 2.0 | 2.0 | 1.9 |
| C.#58 | 0.7 | 0.8 | 0.7 | 0.7 | 0.7 |
| C.#60 | <0.1 | <0.1 | <0.1 | <0.1 | <0.1 |
| C.#62 | <0.1 | <0.1 | <0.1 | <0.1 | <0.1 |

Generally, cholesterol-containing soybean oil that has been extracted exhibits visible turbidity and some loss of its yellow color.

An experiment was carried out to determine the effects of extraction temperature, number of extractions, and history of succinylation treatment on removal of cholesteryl hemisuccinate throughout from succinic anhydride-treated cholesterol-containing soybean oil, as shown in the following (Table 3):

TABLE 3

Effect of Derivatization Step History and Extraction Temperature on Removal of Cholesteryl Hemisuccinate

| Reaction Temp. (°C.) | Extraction Temp. (°C.) | # of Extractions | Free Chol. (mg/100 g) | Total Chol. (mg/100 g) | % Cholesteryl Hemisuccinate Extracted |
|---|---|---|---|---|---|
| 120 | 25 | 3 | 37 | 87 | 87 |
| 170 | 25 | 3 | 8 | 56 | 89 |
| 120 | 45 | 3 | 40 | 89 | 87 |
| 170 | 45 | 3 | 12 | 65 | 87 |
| 120 | 25 | 5 | 36 | 90 | 86 |
| 170 | 25 | 5 | 9 | 76 | 82 |
| 120 | 45 | 5 | 40 | 92 | 86 |
| 170 | 45 | 5 | 6 | 82 | 79 |
| 120 | — | — | 46 | 286 | 6 |
| 170 | — | — | 6 | 291 | 5 |
| Control Oil | | | 287 | 305 | — |

Extractions at 25° C. and 45° C. did not yield significantly different results. Cholesterol-containing soybean oil treated with succinic anhydride for 1 hour at 170° C. or for 2 hours at 120° C. in the presence of catalyst gave similar extraction results. A rather surprising observation was that, regarding extraction number, no substantial benefit was observed for performing 5 instead of 3 extractions. In fact, a single extraction has been shown to remove a similar amount. Maximum cholesteryl hemisuccinate removed in these runs was approximately 85–90%.

EXAMPLE 2

In order to remove additional amounts of the succinylated cholesterol, runs were carried out in the same manner as in Example 1 at a temperature of 170° C., without phosphoric acid catalyst. The succinylated cholesterol-containing soybean oil, without aqueous extraction, was contacted with several cationic resins to ionically bind the hemisuccinates. Samples of succinic anhydride-treated cholesterol-containing soybean oil were washed with 1 volume of deionized water and then centrifuged (1000×g for 10 minutes at 25° C.) to facilitate separation of the oil and water phases. Resin-treatment was performed either in the absence or presence of water. For the treatment in the absence of water, 5 ml of washed, cholesterol-containing soybean oil was combined with 2.5 g resin, and the mixture was vortexed for 10 seconds. The mixture was then centrifuged (1000×g /10 minutes/25° C.) to separate the resin (pellet) and cholesterol-containing soybean oil. For the treatment in the presence of water, 5 ml of washed cholesterol-containing soybean oil was combined with 2.5 g resin and 22.5 ml deionized water, and the mixture was vortexed for 10 seconds. The mixture was then centrifuged as above to separate the resin (pellet), water, and cholesterol-depleted soybean oil. Samples were analyzed for free and total cholesterol by gas chromatography. Table 4 shows that the hydrated anionic exchange resin DEAE-cellulose and shellfish-derived chitosan each removed approximately 40% of the cholesteryl hemisuccinate in one treatment from succinic anhydride-treated cholesterol-containing soybean oil in the presence of water:

TABLE 4

Effect of Resins on Removal of Cholesteryl Hemisuccinate

| Resin | Water | Total Chol. (mg/100 g) | Total Chol. (mg/100 g) | % Cholesteryl Hemisuccinate Removed |
|---|---|---|---|---|
| DEAE-Cellulose | — | 13 | 287 | 7 |
| Chitosan | — | 14 | 291 | 5 |
| None (SA Treated) | — | 10 | 301 | 1 |
| Control SSO | | 287 | 305 | — |
| DEAE-Cellulose | + | 8 | 267 | 42 |
| Chitosan | + | 10 | 232 | 51 |
| None (SA Treated) | + | 9 | 419 | 4 |
| Control SSO | | 410 | 434 | — |

The pH of the aqueous phase of the cholesterol-containing soybean oil-water-resin mixture was 5.5–6.0, so this decrease in cholesteryl hemisuccinate was not a pseudo-base extraction effect.

EXAMPLE 3

In a series of runs carried out like those of Example 1 at a reaction temperature of 170° C. without phosphoric acid catalyst, various extractants were tested for cholesteryl hemisuccinate removal efficiency under the same pH conditions (pH 11.5). The aqueous extractant solutions were, respectively, 10% $Na_2CO_3$, 10% $Na_2CO_3$+5 M NaCl, and 0.01 M NaOH. In effect, the influence of salt (sodium ion) was being investigated. For example, 0.01 M NaOH has a significantly lower salt content than does 10% $Na_2CO_3$ (approximately 2 M in Na) even though both are the same pH. Triple extractions of succinic anhydride-treated cholesterol-containing soybean oil with these solutions were performed after first water washing the succinylated soybean oil as described in Example 1, and it was found that the most effective cholesteryl hemisuccinate removal was achieved with 10% $Na_2CO_3$ (Table 5):

TABLE 5

Effect of Salt on Aqueous Extraction of Cholesteryl Hemisuccinate

| Extractant | Free Chol. (mg/100 g) | Free Chol. (mg/100 g) | % Extracted |
|---|---|---|---|
| 10% $Na_2CO_3$ | 4 | 46 | 96 |
| 10% $Na_2CO_3$ + 5M NaCl | 4 | 77 | 88 |
| 0.01M NaOH | 5 | 371 | 16 |
| 10% $Na_2CO_3$ (intermittent water wash) | 4 | 43 | 96 |
| None (SA Treated) | 5 | 412 | 5 |
| Control Soybean Oil | 410 | 434 | — |

In decreasing order, the performance of the extraction, was 10% $Na_2CO_3$ > 10% $Na_2CO_3$+5 M NaCl > 0.01 M NaOH (very poor). An additional trial was run using 10% $Na_2CO_3$ but performing water-washes between each extraction. The removal of cholesteryl hemisuccinate and the appearance of the cholesterol-containing soybean oil was identical to that of the sample not subjected to intermittent washings.

EXAMPLE 4

It is theorized that difficult-to-remove cholesteryl hemisuccinate may be occupied in some type of waterin-oil emulsion, colloid, or soap. Consistent with this theory, high speed centrifugation has been found to be effective in increasing the removal efficiency, perhaps by breaking the putative emulsion, to remove at least 99% of the cholesteryl hemisuccinate. In this regard, a series of runs were carried out like those of Example 1 at 170° C. without phosphoric acid catalyst. The reacted soybean oil was extracted three times with 10 weight percent aqueous sodium carbonate solution, as described in Example 1. Subsequently, the triple-extracted oil, which had a limited degree of turbidity, was subjected to additional treatment steps. In this regard, one run of the triple-extracted succinylated soybean oil was centrifuged at high speed, at a centrifugal force of 10,000×g for 30 minutes at 25° C. Another run was mixed with diatomaceous earth at an oil/earth weight ratio of about 20:1, and subsequently centrifuged at low speed, at a centrifugal force of 1000×g for 10 minutes at 25° C. The results of this treatment are shown in the Table 6:

TABLE 6

Effects of Centrifugation, Filtration Aid, and Acidic Bleaching Clay on Removal of Cholesteryl Hemisuccinate

| Treatment | Free Chol. (mg/100 g) | Free Chol. (mg/100 g) | % Cholesteryl Hemisuccinate Removed |
|---|---|---|---|
| Control (unreacted soybean oil) | 412 | 449 | — |
| SA-Treated & water-washed | 8 | 427 | 5 |
| Diatomaceous earth - treated | 9 | 414 | 9 |
| Extracted 3 × w 10% Na₂CO₃ | 6 | 66 | 94 |
| Centrifuged at high speed* | 5 | 45 | >99 |
| Diatomaceous earth - treated* | 5 | 44 | >99 |

Samples marked by an asterisk (*) were extracted three times with 10% Na₂CO₃ prior to the treatment shown.

As shown in Table 6, over 99 percent removal of succinylated cholesterol can be accomplished by high speed centrifugation, and/or by the use of an absorbent clay clarification agent.

EXAMPLE 5

Scaled-up runs like those of Example 1, utilizing succinylation treatment of cholesterol-containing soybean oil, were carried out using a 5000 ml round-bottom flask in which 4500 ml of cholesterol-containing soybean oil were heated to 170° C. When this temperature was reached, 450 grams of succinic anhydride were added, and the reaction was allowed to proceed for 60 minutes. At the end of this period, the oil was cooled to room temperature and centrifuged (1000×g for 10 minutes at 25° C.) to sediment the excess unreacted succinic anhydride. The succinic anhydride-treated cholesterol-containing soybean oil was subjected to one extraction with 0.1 volume of 10% Na₂CO₃ at 25° C., without water washes, and centrifuged to recover the oil phase under the same centrifugation conditions. The oil was immediately treated with an absorbent, acid activated montmorillonite bleaching clay (Filtrol 105 from Horshaw/Filtrol) (10% w/v) and centrifuged in the same manner. The oil was treated for a second time with the clay for 30 minutes at 90° C. with magnetic stirring under vacuum. Following each treatment, a portion of the oil was analyzed for free and total cholesterol (by gas chromatography), and for glycerides.

TABLE 7

Scaled Up Succinylation Treatment (Cholesterol Analysis)

| Sample | Free Chol. (mg/100 g) | Free Chol. (mg/100 g) | % Cholesteryl Hemisuccinate Removed |
|---|---|---|---|
| Control SSO | 313 | 338 | — |
| Succinic Anhydride (SA - treated) | <2 | 329 | 3 |
| Na₂CO₃- extracted | <2 | 88 | 80 |
| Filtrol-treated, first time | <2 | 55 | 91 |
| Filtrol-treated, second time | <2 | 37 | 97 |

The single base extraction including centrifugation removed 80% of the cholesteryl hemisuccinate, which could have been higher with increased centrifugation. Removal of 91% and 97% were achieved following the first and second Filtrol 105 treatments, respectively.

Glyceride profiles of the oil sample at each stage of treatment are set forth in the following (Table 8):

TABLE 8

Scaled Up Succinylation Treatment (Glyceride Analysis)

| Lipid | Control | SA-treated | Base-Ext | 1st Filtrol | 2nd Filtrol |
|---|---|---|---|---|---|
| Fatty acids | <0.1 | <0.1 | <0.1 | <0.1 | <0.1 |
| Monoglycerides | <0.1 | <0.1 | 0.2 | <0.1 | <0.1 |
| Diglycerides | 0.6 | 0.2 | 2.9 | <0.1 | 0.1 |
| Triglycerides | | | | | |
| C.#48 | 0.4 | 0.4 | 0.3 | 0.4 | <0.1 |
| C.#50 | 3.8 | 3.8 | 3.6 | 3.7 | 3.5 |
| C.#52 | 27.9 | 27.2 | 27.0 | 27.8 | 28.6 |
| C.#54 | 65.9 | 66.6 | 64.2 | 66.5 | 66.2 |
| C.#56 | <0.1 | <0.1 | <0.1 | <0.1 | <0.1 |
| C.#58 | 1.3 | 1.4 | 1.4 | 1.3 | 1.3 |
| C.#60 | 0.2 | <0.1 | 0.3 | 0.2 | 0.3 |
| C.#62 | <0.1 | <0.1 | <0.1 | <0.1 | <0.1 |

EXAMPLE 6

Succinic acid, either added separately or formed in situ by hydrolysis of succinic anhydride may be used to catalyze the succinylation of free cholesterol in a triglyceride mixture. In this regard, in order to provide a reaction-mixture which is substantially free of succinic acid, dried soybean oil should be used. Cholesterol-containing soybean oil was dried under vacuum with magnetic stirring for 30 minutes at 100° C. When the cholesterol-containing soybean oil cooled to room temperature, a molecular sieve (Davison Type 3A/Grade 564,8-12 mesh, 3 Angstrom pore size) was added to a level of 2% (w/v), and the mixture was gently shaken (50 rpm on rotary shaker) for 18 hours at room temperature. The sieve was removed via centrifugation (1000×g for 10 minutes at 25° C.) and recovered "dried" cholesterol-containing soybean oil was treated with either succinic anhydride (10% w/v) or succinic anhydride (1 M; 10% w/v) plus succinic acid (0.1M) for 60 minutes at 170° C. Treatment of undried cholesterol-containing soybean oil with succinic anhydride (1 M; 10% w/v) served as the control. In a separate run (see Example 7), dried cholesterol-containing soybean oil was treated with various levels of succinic anhydride for 60 minutes at 170° C. For either experiment, samples were withdrawn at various times for measurement of free and total cholesterol by gas chromatography.

Table 9 shows that the moisture was significantly reduced by this double treatment with heating under vacuum giving the best overall drying results (Table 9):

TABLE 9
Effects of Drying Treatments on Moisture Levels in Spent Soybean Oil

| Sample/Treatment | % Moisture |
| --- | --- |
| Control | 0.12 |
| Heated under vacuum | <0.01 |
| Molecular sieve | 0.05 |
| Both of the above | <0.01 |

Figure 3:
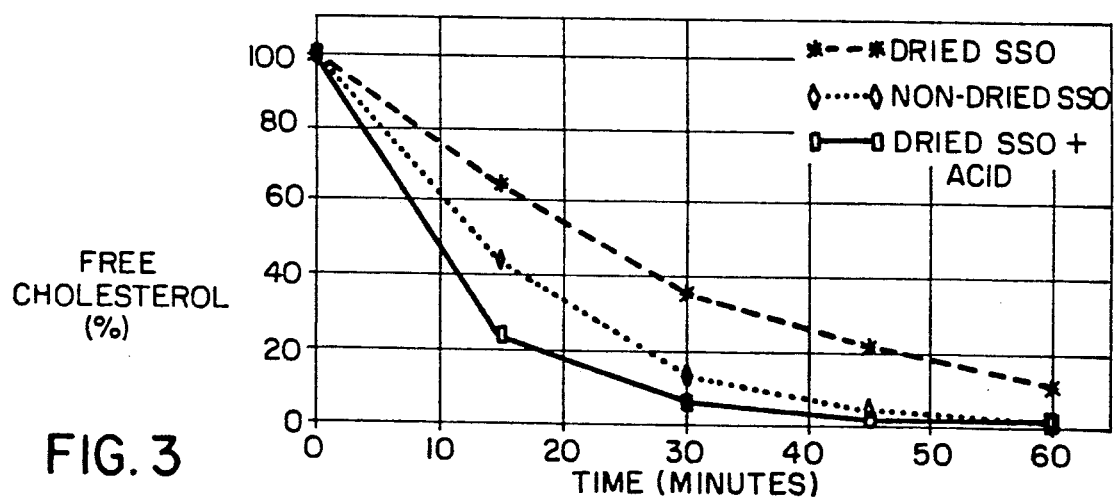
FIG. 3 is a graphical representation of a reaction time course of the reaction completion, comparing fully dried soybean oil with control soybean oil containing a small amount of water, and with soybean oil containing 0.1 molar succinic acid.

Several succinylation runs were carried out like those of Example 1 in which the double-dried cholesterol-containing soybean oil was compared to non-dried cholesterol-containing soybean oil in a derivatization time course study using 1 M succinic anhydride. Also included in this study was double-dried cholesterol-containing soybean oil treated with 1 M succinic anhydride plus 0.1 M succinic acid. The results of these runs are shown in FIG. 3. The time course profile of FIG. 3 shows that the cholesterol in the non-dried cholesterol-containing soybean oil is more rapidly derivatized than in the double-dried cholesterol-containing soybean oil, and that the addition of succinic acid can improve the derivatization rate to that achieved when using the non-dried cholesterol-containing soybean oil.

EXAMPLE 7

Figure 4:
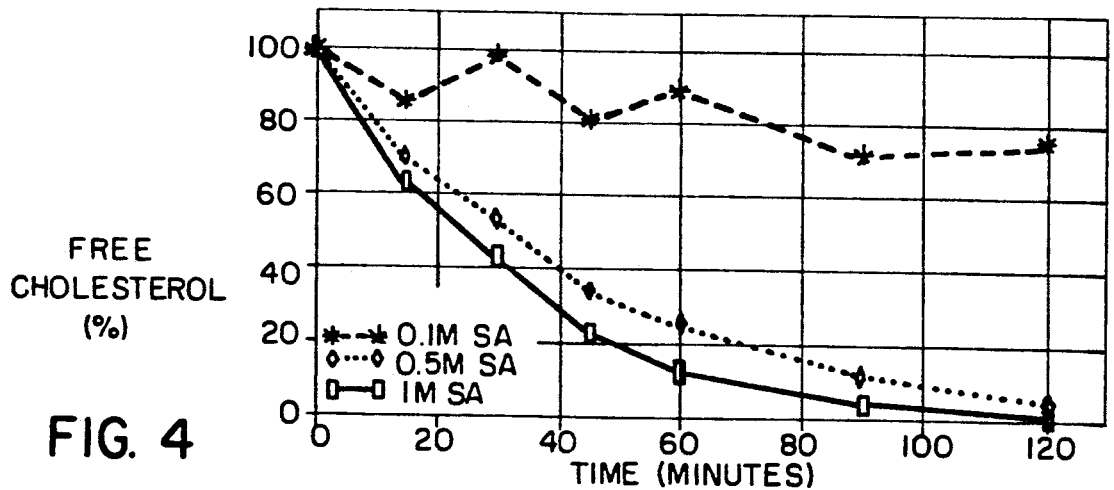
FIG. 4 is a graphical representation of the reaction time course for reaction completion, for various

The double-dried cholesterol-containing soybean oil as prepared in Example 5 was treated with various levels of succinic anhydride (1 M, 0.5 M, or 0.1 M) for 120 minutes at 170° C. In this time course study (FIG. 4), it was found that the rate of decrease in free cholesterol was proportional to the level of succinic anhydride added. It was observed that the derivatization rate (time to achieve ca. 100% decrease free cholesterol) at 1 M succinic anhydride was much slower with this dried cholesterol-containing soybean oil (120 minutes) than with non-dried cholesterol-containing soybean oil.

EXAMPLE 8

Cholesterol-containing soybean oil was succinylated as described in Example 1, at 170° C. without added phosphoric acid. Without any subsequent water or aqueous extractant wash, the succinylated oil was mixed with an acid activated bleaching earth (Filtrol 105) at a ratio of about 33:1 oil:earth, for 30 minutes at 90° C., under reduced pressure. The oil was cooled to ambient temperature and centrifuged at 1000×g for 10 minutes at 25° C. to remove the earth. This single treatment removed about 50 percent of the cholesteryl hemisuccinate from the succinylated oil.

EXAMPLE 9

Butterfat (BF) (50 ml) was subjected to conditions similar to those described for succinylation of soybean oil described in Example 1. The butterfat was heated to 170° C. in the presence of nitrogen. When this temperature was reached, 5 g of succinic anhydride were added and the incubation was allowed to proceed for 60 minutes.

Extraction of succinic anhydride-treated BF to remove the polybasic acylating agent reaction product (cholesteryl hemisuccinate) was performed as follows. To remove the unreacted, excess succinic anhydride, samples of anhydride-treated BF were washed five times with five volumes of deionized water (pH 6) in capped conical tubes. Mixing was achieved by shaking for 10 seconds and phase layer separation was achieved by allowing the sample to stand for 2 minutes at a temperature of >40° C., where the butterfat was melted. It was also found that a single centrifugation above the butterfat melting temperature, i.e., 40° C. was sufficient to remove the unreacted succinic anhydride.

The samples were next subjected to triple extractions at three different pH values and with different extractant volumes. Thus, the water-washed BF samples were combined with 0.1 volume of 10% $Na_2CO_3$ (pH 11.5), 0.1 or 4 volumes of 0.1% $Na_2CO_3$ (pH 10), or 0.1 or 4 volumes of 0.1 M Tris-HCl (pH 8) in capped conical tubes. The contents of the tubes were gently mixed by inversion back-and-forth ten times. The samples were immediately centrifuged (1000×g for 2 minutes at 25° C.) to separate the aqueous, soapy-interfacial, and BF phases. The BF phases were collected and the extractions were repeated two more times. Except for the centrifugations, all of the steps in the above procedure were performed at 60° C. Free and total cholesterol were quantitated using gas chromatography in order t calculate the percentage removal of formed derivatives. As shown in Table 10, it was found that >92% of the cholesteryl hemisuccinate could be removed at pH≧8. The cleanest separation of the BF and aqueous phases, was achieved using the pH 11.5 extractant.

TABLE 10
Extractions at Various pH Values

| Extractant | pH | Extractant/Oil Ratio | Free Chol. (mg/100 g) | Total Chol. (mg/100 g) | % Cholesteryl Hemisuccinate Extracted |
| --- | --- | --- | --- | --- | --- |
| Water | 6 | 5 | 18 | 251 | 8.3 |
| 0.1M Tris-HCl | 8 | 0.1 | 18 | 238 | 13.8 |
| 0.1M Tris-HCl | 8 | 4 | 9 | 48 | 92.9 |
| 0.1% $Na_2CO_3$ | 10 | 0.1 | 22 | 253 | 7.5 |
| 0.1% $Na_2CO_3$ | 10 | 4 | 17 | 40 | 96.3 |
| 10% $Na_2CO_3$ | 11.5 | 0.1 | 14 | 46 | 93.8 |

Because the percentage cholesterol esters are 10-15% of the total cholesterol, the maximum total cholesterol removal in BF is limited to 85-90%. Prehydrolysis of the endogenous esters with cholesterol esterase preferably having little or no lipase activity may be utilized to make the total cholesterol pool available for derivatization.

EXAMPLE 10

Acid chlorides may also be used to derivatize cholesterol to a more polar form in triglycerides such as vegetable oil or butterfat. 2.5 ml of anhydrous butterfat were combined with 100 μl of succinyl chloride by vortexing, and then incubating the mixture for 1 hour at 60° C. At the end of this inoculation, about 1 ml of the mixture was vortexed with 4 ml of water at 50°-60° C. The top butterfat layer was collected, and 0.5 ml of this butterfat were added to 1.5 ml of a chloroform:methanol (2:1) solvent mixture. A thin-layer chromatography test revealed qualitatively that the cholesterol content decreased and that a more polar compound was formed.

EXAMPLE 11

Phosphorous oxychloride may also be used to selectively remove cholesterol from animal or vegetable triglycerides. 512 grams of anhydrous butterfat were placed in a 3 liter-capacity, 3-neck flask equipped with a thermometer, magnetic stirrer, heating mantle, and side-arm vacuum with a nitrogen take-off. The butterfat was heated to 60° C., and dried under full vacuum for 30 minutes. The vacuum was then broken, and 2.5 ml of phosphorous oxychloride were added with a syringe. The mixture was then heated for 4 hours at 60° C. During the heating period, the mixture became a dark brown color.

One half of the reaction mixture was treated with 100 ml of water, after which the layers were separated and extracted through the use of a separatory funnel. This extraction with water was repeated three times. The color of the mixture returned to yellow, and had a cheese-like odor.

While specific aspects of the present invention have been described in detail with respect to specific embodiments it will be appreciated that various modifications, adaptations and variations will be apparent from the present disclosure, which are intended to be within the scope of the following claims.

What is claimed is:

1. A method for removing cholesterol from edible triglyceride oils comprising the steps of:
    (a) reacting a substantially anhydrous cholesterol-containing triglyceride oil having a free cholesterol content with at least a 2-fold molar excess of a polybasic acylating agent with respect to the free cholesterol content of the oil, said reaction taking place at a temperature above the melting temperature of the oil for a time sufficient to esterify at least about 50 percent of the free cholesterol of the oil and to provide a reaction mixture of an acid cholesteryl monoester, unreacted polybasic acylating agent and cholesterol depleted triglyceride oil,
    (b) separating any unreacted polybasic acylating agent from said reaction mixture; and
    (c) recovering said cholesterol depleted triglyceride oil from said reaction mixture by contacting said reaction mixture with a separation phase material that is capable of partitioning the cholesteryl monoester from the triglyceride oil to the separation phase material to form an extraction mixture, said separation phase material being selected from the group consisting of a liquid which is not miscible with the triglyceride oil and which is capable of reducing the solubility of the cholesteryl monoester in the triglyceride oil and a solid which preferentially adsorbs the cholesteryl monoester from the triglyceride oil.

2. A method in accordance with claim 1 wherein said edible triglyceride oil is selected from the group consisting of butterfat, beef tallow, fish oil, lard, soybean oil, canola oil, corn oil, sunflower oil, cottonseed oil, safflower oil, olive oil, peanut oil, and mixtures thereof, and wherein at least about 90 percent of the free cholesterol of the oil is esterified with the polybasic acylating agent.

3. A method in accordance with claim 1 wherein said polybasic acylating agent is selected from the group consisting of cyclic acid anhydride and polybasic acid halide.

4. A method in accordance with claim 1 wherein said polybasic acylating agent is selected from the group consisting of malonic anhydride, glutaric anhydride, succinic anhydride, phthalic anhydride, maleic anhydride copolymer, maleic anhydride homopolymer, or phosphorous oxychloride.

5. A method in accordance with claim 1 wherein the moisture content of the cholesterol-containing triglyceride oil is less than 1 weight percent, based on the weight of the oil.

6. A method in accordance with claim 1 wherein the moisture content of the triglyceride oil is less than 0.2 weight percent, based on the weight of the oil.

7. A method in accordance with claim 1 wherein the triglyceride oil contains in the range of from 0.001 to about 0.1 weight percent moisture, based on the weight of the oil.

8. A method in accordance with claim 1 wherein said polybasic acylating agent is selected from the group consisting of citric acid, acetic acid, succinic acid, lactic acid, phosphoric acid, and mixtures thereof which is used at a level in the range of from 0.001 to about 1.0 weight percent, based on the weight of the oil, as an esterification catalyst.

9. A method in accordance with claim 1 wherein said polybasic acylating agent is succinic anhydride and wherein the reaction is carried out at a temperature of at least about 100° C. for at least about 5 minutes.

10. A method in accordance with claim 1 wherein said excess polybasic acylating agent is separated from said reaction mixture in step (b) by centrifugation or filtration at a temperature below the melting point of said polybasic acylating agent.

11. A method in accordance with claim 1 wherein said separation phase material is a liquid selected from the group consisting of water, a lower alkyl monohydric alcohol, a lower alkyl polyol, and mixtures thereof.

12. A method in accordance with claim 1 wherein said separation phase material is a liquid having a pH greater than 7.

13. A method in accordance with claim 12 wherein the pH of said liquid separation phase material is in the range of from about 8 to about 13, and wherein said liquid phase material is an aqueous solution or suspension of a basic material selected from the group consisting of alkali hydroxides, alkaline earth hydroxides, carbonates, bicarbonates, phosphates, and mixtures of alkali hydroxides and alkaline earth hydroxides.

14. A method in accordance with claim 11 wherein the weight ratio of the triglyceride oil to the liquid separation phase material is in the range of from about 0.1 to about 100.

15. A method in accordance with claim 12 wherein the extraction mixture is subjected to a centrifugal force of at least about 500×g, to separate the components into a low density, cholesterol-depleted oil phase, a relatively high density aqueous phase, and an intermediate phase containing a predominant portion of basic salt of the cholesteryl monoester extracted from the oil phase.

16. A method in accordance with claim 1 wherein a solid separation phase material is utilized to separate or partition the acidic cholesteryl monoester from the triglyceride oil.

17. A method in accordance with claim 16 wherein said solid separation phase material is an organic solid phase separation material, which is contacted with the triglyceride oil containing the cholesteryl monoester reaction product at a weight ratio of from about 5000 of the oil to about 0.5 to the solid phase separation material.

18. A method in accordance with claim 17 wherein the contacting step is carried out under conditions of elevated temperature of at least about 35° C. and subatmospheric pressure of less than 50 millimeters of mercury.

19. A method in accordance with claim 16 wherein the solid separation phase material is an organic material which is capable of preferentially adsorbing the acidic cholesteryl monoester from the triglyceride oil by ionic electrostatic interaction and salt formation.

20. A method in accordance with claim 19 wherein said organic material is selected from the group consisting of anionic exchange resin and chitosan.

21. A method in accordance with claim 11 wherein the lower alkyl polyol is glycerol.

22. A method in accordance with claim 17 wherein the inorganic solid phase separation material is selected from the group consisting of bleaching clay and diatomaceous earth.

23. A method in accordance with claim 11 wherein said lower alkyl monohydric alcohol is selected from the group consisting of methanol, ethanol and mixtures thereof.

* * * * *

UNITED STATES PATENT AND TRADEMARK OFFICE
CERTIFICATE OF CORRECTION

PATENT NO. : 5,128,162
DATED : July 7, 1992
INVENTOR(S) : Wretzel et al.

It is certified that error appears in the above-identified patent and that said Letters Patent is hereby corrected as shown below:

TITLE PAGE:
[56] OTHER REFERENCES, line 1, change "Strveitwieser" to --Streitwieser--.

Column 8, line 46, first column of Table 2, change "Liquid" to --Lipid--.
Column 14, line 21, change "t" (at end of line) to --to--.

Claim 4, Column 16, line 1, replace "or" with --and--.
Claim 7, Column 16, line 11, change "from 0.001" to --from about 0.001--.
Claim 8, Column 16, line 18, change "from 0.001" to --from about 0.001--.
Claim 17, Column 16, line 63, change "organic" to --inorganic--.
Claim 20, Column 18, line 1, change dependency from "Claim 19" to --Claim 1--.

Signed and Sealed this

Seventh Day of September, 1993

Attest:

BRUCE LEHMAN

Attesting Officer     Commissioner of Patents and Trademarks